United States Patent
Kamisetty et al.

(10) Patent No.: US 9,450,877 B1
(45) Date of Patent: Sep. 20, 2016

(54) METHODS AND APPARATUS FOR LOAD BALANCING COMMUNICATION SESSIONS

(71) Applicant: Juniper Networks, Inc., Sunnyvale, CA (US)

(72) Inventors: Jeevan Madhu Kamisetty, San Jose, CA (US); Sandeep Siroya, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 604 days.

(21) Appl. No.: 13/838,082

(22) Filed: Mar. 15, 2013

Related U.S. Application Data

(60) Provisional application No. 61/738,611, filed on Dec. 18, 2012.

(51) Int. Cl.
*H04L 12/931* (2013.01)
*H04L 12/803* (2013.01)
*H04Q 11/00* (2006.01)

(52) U.S. Cl.
CPC .......... *H04L 47/125* (2013.01); *H04Q 11/0005* (2013.01)

(58) Field of Classification Search
CPC ............................ H04L 49/70; H04L 49/357
See application file for complete search history.

(56) References Cited

U.S. PATENT DOCUMENTS

| | | | |
|---|---|---|---|
| 8,705,351 B1 * | 4/2014 | McGlaughlin et al. | 370/230 |
| 8,839,043 B1 * | 9/2014 | Long et al. | 714/43 |
| 8,948,176 B1 * | 2/2015 | Desanti et al. | 370/392 |
| 8,953,606 B1 * | 2/2015 | McGlaughlin et al. | 370/392 |
| 2004/0047294 A1 * | 3/2004 | Ain et al. | 370/238 |
| 2009/0025007 A1 * | 1/2009 | Hara et al. | 718/105 |
| 2009/0245791 A1 * | 10/2009 | Thaler et al. | 398/45 |
| 2010/0115132 A1 * | 5/2010 | Hirata et al. | 709/245 |
| 2011/0299539 A1 * | 12/2011 | Rajagopal et al. | 370/395.53 |
| 2012/0177042 A1 * | 7/2012 | Berman | 370/392 |
| 2012/0254440 A1 * | 10/2012 | Wang | 709/226 |
| 2014/0003440 A1 * | 1/2014 | Hathorn | 370/401 |
| 2015/0043584 A1 * | 2/2015 | Ayandeh | 370/392 |

OTHER PUBLICATIONS

"Cisco Nexus 5000 Series NX-OS Operations Guide, Release 5.1(3)N1(1)," Chapter 4, © 2012 Cisco Systems, Inc., Jun. 11, 2012 (19 pages).

Understanding Load Balancing in an FCoE-FC Gateway Proxy Fabric, Retrieved from internet, http://www.juniper.net/techpubs/en_US/junos12 .1/topics/concept/fibre-channel-proxy-load-balancing-understanding.html, Published Mar. 23, 2012.

* cited by examiner

*Primary Examiner* — Fan Ng
(74) *Attorney, Agent, or Firm* — Cooley LLP

(57) ABSTRACT

In some embodiments, an apparatus includes a gateway device that can be operatively coupled to a switch via a set of links. The gateway device can operatively couple a network node during a communication session with the switch, and can store an association between the communication session of the network node and a link such that data sent via the communication session of the network node is sent via the link. In such embodiments, the gateway device can receive, from a virtual port associated with the network node, a login request. The gateway device can send the login request to the switch to initiate a communication session between the virtual port and the switch. The gateway device can also associate the communication session of the virtual port with the link based on the communication session of the network node being associated with the link.

21 Claims, 4 Drawing Sheets

|  | Session # | Link # | Ethernet Port # | Fibre Channel Port # |
|---|---|---|---|---|
| ENode #152 |  |  |  |  |
| VN_Port #153 | 1 | 1 | 112 | 116 |
| VN_Port #154 | 5 | 1 | 112 | 116 |
| VN_Port #155 | 2 | 1 | 112 | 116 |
|  | 10 | 1 | 112 | 116 |
| ENode #162 |  |  |  |  |
| VN_Port #163 | 3 | 2 | 113 | 117 |
| VN_Port #164 | 5 | 2 | 113 | 117 |
| VN_Port #165 | 9 | 2 | 113 | 117 |
|  | 6 | 2 | 113 | 117 |
| ENode #172 |  |  |  |  |
| VN_Port #173 | 4 | 3 | 114 | 118 |
| VN_Port #174 | 7 | 3 | 114 | 118 |
| VN_Port #175 | 8 | 3 | 114 | 118 |
|  | 11 | 3 | 114 | 118 |

Receive, from a network node and at a gateway device connecting the network node with a switch, a first login request.
502

Associate, a session between the network node and the switch with a link from the set of links based on the first login request.
504

Receive, from a virtual port associated with the network node and at a gateway device a second login request.
506

Define a third login request based on the second login request.
508

Send, the third login request to the switch to initiate a session between the virtual port and the switch.
510

Associate, the session between the virtual port and the switch with the link from the set of links based on the session between the network node being associated with the link.
512

FIG. 5

METHODS AND APPARATUS FOR LOAD BALANCING COMMUNICATION SESSIONS

CROSS REFERENCE TO RELATED APPLICATION

This application claims priority to and the benefit of U.S. Provisional Patent Application No. 61/738,611, filed Dec. 18, 2012, and entitled "Methods and Apparatus for Automated Load Rebalancing," which is incorporated herein by reference in its entirety.

BACKGROUND

Some embodiments described herein relate generally to methods and apparatus for automated load balancing and specifically to methods and apparatus for automated "ENode-based" load balancing between multiple links in a mixed Ethernet and Fibre Channel portion of a computer network.

In a mixed Ethernet and Fibre Channel portion of a computer network, Fibre Channel over Ethernet (FCoE) sessions are typically established via Fabric Login (FLOGI) requests and Fabric Discovery (FDISC) requests from various FCoE ENodes. The sessions can be load-balanced across all interfaces (or ports) of a Fibre-Channel Switch via a Load Balancer or a gateway device. Typically, loads are balanced based on each interface's load (current number of sessions) and capacity (bandwidth). This can cause logins (e.g., FLOGI and FDISC) from one FCoE ENode to be distributed across multiple interfaces of the Fibre-Channel Switch. For example, one interface of the Fibre-Channel Switch can be associated with the FCoE ENode's FLOGI, while multiple other interfaces of the Fibre-Channel Switch can be associated with the ENode's FDISC logins. This can produce problems when an interface of the Fibre-Channel Switch becomes inactive because sessions associated with multiple FCoE Enodes can be deactivated.

Accordingly, a need exists for methods and apparatus that can associate multiple sessions of an FCoE ENode through the same interface of a Fibre-Channel Switch.

SUMMARY

In some embodiments, an apparatus includes a gateway device that can be operatively coupled to a switch via a set of links. The gateway device can operatively couple a network node during a communication session with the switch, and can store an association between the communication session of the network node and a link such that data sent via the communication session of the network node is sent via the link. In such embodiments, the gateway device can receive, from a virtual port associated with the network node, a login request. The gateway device can send the login request to the switch to initiate a communication session between the virtual port and the switch. The gateway device can also associate the communication session of the virtual port with the link based on the communication session of the network node being associated with the link.

BRIEF DESCRIPTION OF THE DRAWINGS

FIG. 4 is an example of data organized in a session table of a gateway device, according to an embodiment.

FIG. 5 is a flowchart illustrating a method for associating a communication session between a network node and a switch and associating a communication session between a virtual port and a switch, according to an embodiment.

DETAILED DESCRIPTION

Figure 1:
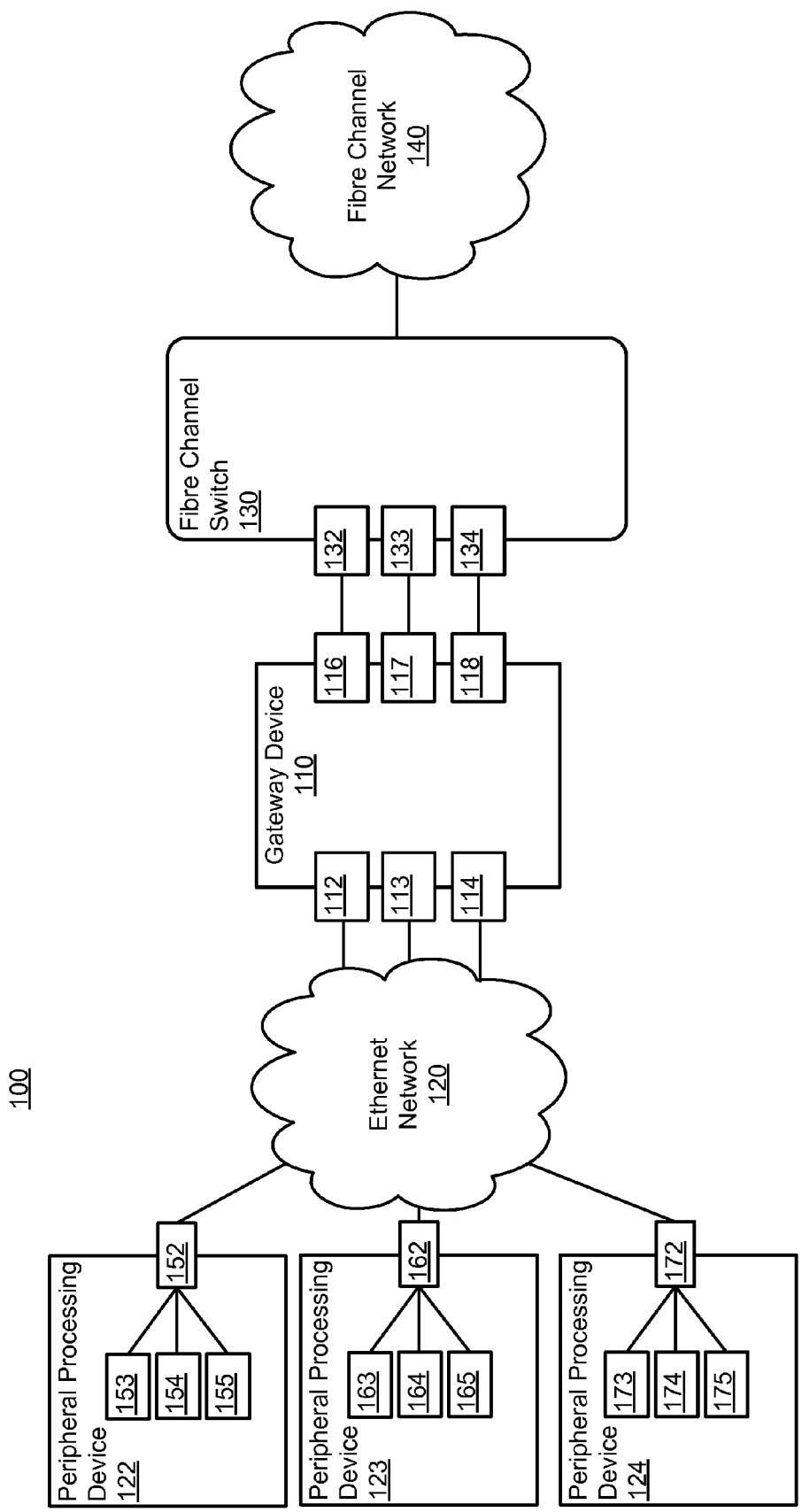
FIG. 1 is a schematic illustration of a mixed Ethernet and Fibre Channel portion of a computer network, according to an embodiment.

In some embodiments, an apparatus includes a gateway device that can be operatively coupled to a switch via a set of links. The gateway device can operatively couple a network node during a communication session with the switch, and can store an association between the communication session of the network node and a link from the set of links such that data sent via the communication session of the network node is sent via the link. In such embodiments, the gateway device can receive, from a virtual port associated with the network node, a login request. The gateway device can send, based on the login request from the virtual port, a login request to the switch to initiate a communication session between the virtual port and the switch. The gateway device can also associate the communication session of the virtual port with the link from the set of links based on the communication session of the network node being associated with the link.

In some embodiments, a non-transitory processor-readable medium storing code representing instructions to be executed by a processor can cause the processor to receive, from a network node and at a gateway device connecting the network node with a switch, a first login request where the gateway device is operatively coupled to the switch via a set of links. In such embodiments, the code can cause the processor to associate a session between the network node and the switch with a link from the set of links based on the first login request, and can receive, from a virtual port associated with the network node and at the gateway device, a second login request. The code causes the processor to define a third login request based on the second login request and send the third login request to the switch to initiate a session between the virtual port and the switch. The code further causes the processor to associate the session between the virtual port and the switch with the link from the set of links based on the session between the network node and the switch being associated with the link.

In some embodiments, an apparatus includes a load balancing module that can be implemented in a gateway device operatively coupled to a switch via a set of links. In such embodiments, the load balancing module can associate a communication session between a network node and the switch with a link from the set of links such that data units of the communication session between the network node and the switch are sent between the gateway device and the switch via the link. In such embodiments, the apparatus also includes a session initiation module that can be implemented in the gateway device and that is operatively coupled to the load balancing module. In such embodiments, the session initiation module can receive, from a virtual port associated with the network node, a request to login to the switch. The session initiation module can send, based on the request, a login signal to the switch such that the switch initiates a communication session between the virtual port and the switch. In such embodiments, the load balancing module can receive an indication of the communication session between the virtual port and the switch. The load balancing module can also associate the communication session between the virtual port and the switch with the link from the set of links based on the communication session between the network node and the switch being associated with the link.

As used in this specification, the singular forms "a," "an" and "the" include plural referents unless the context clearly dictates otherwise. Thus, for example, the term "a peripheral processing device" is intended to mean a single peripheral processing device or multiple peripheral processing devices.

As used herein, a module can be, for example, any assembly and/or set of operatively-coupled electrical components associated with performing a specific function, and can include, for example, a memory, a processor, electrical traces, optical connectors, software (stored in memory and/or executing in hardware) and/or the like.

FIG. 1 is a schematic illustration of a mixed Ethernet and Fibre Channel portion of a computer network, according to an embodiment. More specifically, FIG. 1 illustrates a network portion 100 that includes a gateway device 110 physically and/or operatively coupled to peripheral processing devices 122-124 (via an Ethernet network 120 and Ethernet ports 112-114) and a Fibre Channel switch 130 (via Fibre Channel ports 116-118). The Fibre Channel switch 130 is operatively and/or physically coupled to the gateway device 110 via the Fibre Channel Ports 132-134, and to a Fibre Channel network 140. The peripheral processing devices 122-124 are operatively and/or physically coupled to the gateway device 110 via the FCoE ports 152, 162 and 172 (e.g., FCoE ENodes), respectively, and the Ethernet network 120. The FCoE ports 152, 162 and 172 (e.g., FCoE ENodes) are operatively coupled to the Virtual Fibre Channel N ports 153-155, 163-165 and 173-175, respectively.

The network portion 100 can be a combination of hardware modules and/or software modules (executing on hardware and/or stored in memory) configured to transmit data between any of the peripheral processing devices 122-124 and the Fibre Channel network 140 via the Ethernet network 120, the gateway device 110 and the Fibre Channel switch 130. The Network portion 100 can be or include, for example, a portion of a data center fabric, local area network (LAN), wide area network (WAN), storage area network (SAN), intranet, and/or the Internet.

The gateway device 110 can be, for example, an FCoE gateway. In some instances, the gateway device 110 can be configured to transmit data based at least in part on Ethernet, Fibre Channel and/or FCoE network protocols via the Ethernet ports 112-114 and/or the Fibre Channel ports 116-118. In such instances, the Ethernet ports 112-114 of the gateway device 110 can be configured to send FCoE frames to and/or receive FCoE frames from any of the FCoE ports 152, 162 and 172 via the Ethernet network 120. In such instances, the Fibre Channel ports 116-118 of the gateway device 110 can be Fibre Channel ports configured to send Fibre Channel frames to and/or receive Fibre Channel frames from the Fibre Channel switch 130.

Each virtual port associated with the Fibre Channel ports 116-118 of the gateway device 110 can be associated with and/or correspond to one or more virtual ports 153-155, 163-165, and 173-175, respectively, of the peripheral processing devices 122-124. For example, a virtual port associated with the Fibre Channel port 116 can be configured to send data to and/or receive data from the virtual port 153 and a virtual port associated with the Fibre Channel port 117 can be configured to send data to and/or receive data from the virtual port 163. Moreover, in some instances, each FCoE port 152, 162 and 172 (e.g., FCoE ENodes) can be associated with a Fibre Channel port 116-118. In such instances, for example, FCoE port 152 can be associated with Fibre Channel port 116 and FCoE port 162 can be associated with Fibre Channel port 117. In some instances, as described in further detail herein, each virtual port 153-155, 163-165, 173-175 is associated with the Fibre Channel port 116-118 that is associated with its FCoE port 152, 162, 172. Each FCoE port 152, 162, 172 is associated with a Fibre Channel port 116-118 in response to logging into the Fibre Channel switch 130 using a Fabric Login (FLOGI) signal. Similarly, each virtual port 153-155, 163-165, 173-175 can be associated with a Fibre Channel port 116-118 in response to logging into the Fibre Channel switch 130 using a Fabric Discovery (FDISC) signal.

The assignments to the Fibre Channel ports 116-118 can be distributed across the Fibre Channel ports 116-118. Similarly stated, the load being sent from the peripheral processing devices 122-124 to the Fibre Channel switch 130 can be balanced by the gateway device 110. In some instances and as described in further detail herein, the gateway device 110 can load balance on a per-FCoE-port 152, 162, 172 basis (i.e., on an ENode or FLOGI basis). In such instances, the gateway device 110 can assign or attempt to assign each FCoE port 152, 162, 172 (i.e., each FLOGI) and all of its associated virtual ports 153-155 (for FCoE port 152), 163-165 (for FCoE port 162), 173-175 (for FCoE port 172) to a Fibre Channel port 116-118 such that the assignments of the FCoE ports 152, 162, 172 are substantially balanced across the Fibre Channel ports 116-118. For example, FCoE port 152 (and virtual ports 153-155) can be associated with Fibre Channel port 116, FCoE port 162 (and virtual ports 162-165) can be associated with Fibre Channel port 117 and FCoE port 172 (and virtual ports 172-175) can be associated with Fibre Channel port 118. In such instances, the FCoE ports 152, 162, 172 are taken into account to load balance across the Fibre Channel ports 116-118, and the virtual ports 153-155, 163-165, 173-175 are not taken into account when load balancing or load rebalancing. Similarly stated, load rebalancing across Fibre Channel ports 116-118 can be based on FLOGIs and not FDISCs.

In other instances, the load rebalancing across the Fibre Channel ports 116-118 can be based on other parameters such as, for example, the bandwidth requirements of the virtual ports 153-155, 163-165, 173-175 and/or the FCoE ports. In such instances, the bandwidth requirements of a virtual port 153-155, 163-165, 173-175 and/or an FCoE port 152, 162, 172 is used to assign a Fibre Channel port 116-118. In some instances, each of the Ethernet ports 112-114 can be a physical Ethernet port configured to exchange data with any of the peripheral processing devices 122-124 via the Ethernet network 120 and the FCoE ports 152, 162 and 172, respectively. Although not shown in FIG. 1, in some instances, each of the Ethernet ports 112-114 can be physically coupled to one of multiple Ethernet network interface cards (NICs) included in the gateway device 110.

As shown in FIG. 1, each of the Fibre Channel ports 116-118 of the gateway device 110 is uniquely coupled to one of the Fibre Channel ports 132-134 of the Fibre Channel switch 130 via either a wired or a non-wired link. In some instances, each of the Fibre Channel ports 116-118 can be a physical Fibre Channel port configured to allow exchange of one or more Fibre Channel frames between the gateway device 110 and the Fibre Channel switch 130.

Although not shown in FIG. 1, the gateway device 110 can include one or more data structures indicating one or more switching policies, rules and/or filters. For example, in some configurations, the gateway device 110 can include and/or be operatively coupled to a memory storing a switching table and/or filter database (not shown in FIG. 1) used by the gateway device 110 when switching data units such as, for example, data frames to one or more of the peripheral processing devices 122-124 and/or the Fibre Channel switch 130. Accordingly, the gateway device 110 can serve as a gateway between the peripheral processing devices 122-124 and the Fibre Channel switch 130, allowing for the transmission of FCoE frames from the peripheral processing devices 122-124 to the Fibre Channel switch 130, and for the transmission of Fibre Channel frames from the Fibre Channel switch 130 to any of the peripheral processing devices 122-124.

In some configurations, the gateway device 110 can be physically located within the same physical chassis as the Fibre Channel switch 130. In some instances, the gateway device 110 can function as both an FCoE gateway and a Fibre Channel switching device. Alternatively, in other instances, the gateway device 110 and the Fibre Channel switch can be located within different chasses.

The Ethernet network 120 can be any combination of network hardware modules and/or software modules (executing in hardware and/or stored in memory) that together comprise an Ethernet network. The Ethernet network 120 can include, for example, one or more Ethernet-compatible switches, routers, peripheral devices, servers, line cards and/or network interface cards (NICs). In some configurations, the Ethernet network 120 can include one or more devices and/or modules physically and/or operatively coupled via cable (such as Category 5 cable) and/or one or more wireless connections. In other configurations, the peripheral processing devices 122-124 are directly coupled to the gateway device 110 (i.e., without any intervening devices and/or modules).

As shown in FIG. 1, the Ethernet network 120 is operatively and/or physically coupled to each of the peripheral processing devices 122-124 via the FCoE ports 152, 162 and 172, respectively. Although not shown in FIG. 1, in some instances, any or all of the peripheral processing devices 122-124 can be included in the Ethernet network 120. In some instances, the Ethernet network 120 can transmit one or more FCoE frames to one or more of the peripheral processing devices 122-124. The one or more FCoE frames (not shown in FIG. 1) can include encapsulated Fibre Channel frames originally sent from the Fibre Channel network 140 and/or the Fibre Channel switch 130. Additionally, the Ethernet network 120 can optionally receive one or more FCoE and/or Ethernet frames from any of the peripheral processing devices 122-124 for transmission to the Fibre Channel switch 130 and/or the Fibre Channel network 140 via the gateway device 110.

Each of the peripheral processing devices 122-124 can be any combination of hardware modules and/or software modules (executing in hardware and/or stored in memory) capable of transmitting information to and/or receiving information from the gateway device 110 via the Ethernet network 120. In some instances, one or more of the peripheral processing devices 122-124 can be a server device, an application server, a database system, a storage device, a gateway, a workstation, a compute device and/or the like. Each of the peripheral processing devices 122-124 can optionally be, for example, a compute node, a service node, a router, and/or a storage node. In some instances, one or more of the peripheral processing devices 122-124 can perform one or more computing tasks, such as one or more of data storage, software-as-a-service (SAS), web service, content request, or other computing tasks. In some instances, one or more of the peripheral processing devices 122-124 can be a Fibre Channel-based device operatively and/or physically coupled to one or more other Fibre Channel-based devices, such as a Fibre Channel switch, a Fibre Channel fabric, a Storage Area Network (SAN), etc.

As shown in FIG. 1, the peripheral processing devices 122-124 can include the FCoE ports 152, 162 and 172 (e.g., FCoE ENodes), respectively, and the Virtual Fibre Channel N ports 153-155, 163-165 and 173-175 (e.g., FCoE VN Ports), respectively. In some instances, each of the Virtual Fibre Channel N ports 153-155, 163-165 and 173-175 can be configured to send one or more Fibre Channel frames for encapsulation within an FCoE frame and for subsequent transmission by the corresponding FCoE port 152, 162 and 172, respectively. The corresponding FCoE port 152, 162 and 172 can transmit the FCoE frame to the gateway device 110 via the Ethernet network 120. Each of the Virtual Fibre Channel N ports 153-155, 163-165 and 173-175 can also be configured to receive one or more Fibre Channel frames that have been extracted and/or decapsulated from one or more FCoE frames, each of the FCoE frames having been received by the corresponding FCoE ports 152, 162 and 172 via the Ethernet network 120.

In some instances, the peripheral processing devices 122-124 can be in communication with the Ethernet network 120 via any suitable connection such as, for example, an optical connection (e.g., an optical cable and optical connectors), an electrical connection (e.g., an electrical cable and electrical connectors), and/or the like. Similarly stated, each of the FCoE ports 152, 162 and 172 can provide a communication interface through which a peripheral processing device 122-124 can be operatively coupled to the Ethernet network 120.

As such, the peripheral processing devices 122-124 are configured to send data (e.g., Ethernet frames, FCoE frames, data frames, data cells, etc.) to and receive data from the Ethernet network 120. In some instances, each connection between the peripheral processing devices 122-124 and the Ethernet network 120 is a direct link. Such a link can be said to be a single physical hop link. In other instances, the peripheral processing devices 122-124 can be operatively coupled to the Ethernet network 120 via intermediate modules and/or devices. Such a connection can be said to be a multiple physical hop link. In some instances, any combination of the peripheral processing devices 122-124 can be physically located within the same physical chassis as one another and/or any other device included in the Ethernet network 120. In other instances, each of the peripheral processing devices 122-124 can be located within a different chassis.

The FCoE ports 152, 162 and 172 can be physical Ethernet ports capable of sending and/or receiving one or more Ethernet and/or FCoE frames. In some instances, each of the FCoE ports 152, 162 and 172 can be associated with and/or located on a physical line card (not shown in FIG. 1), such as an Ethernet NIC. In other instances, each of the FCoE ports 152, 162 and 172 can include and/or be associated with a frame formatter module (not shown in FIG. 1) included in each of the peripheral processing devices 122-124, respectively. These frame formatter modules can each be configured to encapsulate Fibre Channel frames received from a virtual Fibre Channel N port within FCoE frames for transmission via the Ethernet network 120. In such instances, each such frame formatter module can be further configured to decapsulate and/or extract Fibre Channel frames from within FCoE frames received via the Ethernet network 120. In some instances, the FCoE Ports 152, 162 and 172 can also initiate and send FCoE frames to the gateway device 110 via the Ethernet network 120 that do not originate from the virtual ports 153-155, 163-165, 173-175.

The Virtual Fibre Channel N ports 153-155, 163-165 and 173-175 can be virtual Fibre Channel N ports similar to those generally associated with Fibre Channel and/or FCoE networks. In some instances, one or more of the Virtual Fibre Channel N ports 153-155, 163-165 and 173-175 can constitute one of two virtual end nodes that define a virtual link. In such instances, each such Virtual Fibre Channel N port can each be operatively coupled to a Virtual Fibre Channel F port that is (not shown in FIG. 1) instantiated at the Fibre Channel switch 130.

The Fibre Channel switch 130 can be any combination of hardware modules and/or software modules (executing in hardware and/or stored in memory) configured to perform switching of Fibre Channel frames received from the gateway device 110 and/or the Fibre Channel network 140. As shown in FIG. 1, the Fibre Channel switch 130 is situated between the gateway device 110 and the Fibre Channel network 140, and can be configured to perform known switching tasks on Fibre Channel frames and/or packets transmitted between the gateway device 110 and the Fibre Channel network 140. In some instances, the Fibre Channel switch 130 can be a Fibre Channel Forwarder (FCF). As also shown in FIG. 1, the Fibre Channel switch 130 includes Fibre Channel ports 132-134, each of which is operatively and/or physically coupled to one of the Fibre Channel ports 116-118 on the gateway device 110. In some instances, each of the Fibre Channel ports 132-134 of the Fibre Channel switch 130 can be a Fibre Channel port configured to exchange one or more Fibre Channel frames with a single Fibre Channel port from the Fibre Channel ports 116-118.

In some instances, the Fibre Channel switch 130 can perform initialization and/or login functions for a Fibre Channel network and/or an FCoE network. In some instances, the gateway device 110 can receive initialization requests from the Virtual Fibre Channel N ports 153-155 according to a standard protocol such as an FCoE Initialization Protocol (FIP). In such instances, the gateway device 110 can decapsulate the initialization request and send fabric login (FLOGI) signals to the Fibre Channel switch 130 for each Fibre Channel port 116-118. In response to receiving such initialization requests, the Fibre Channel switch 130 can assign a virtual port and/or physical port (e.g., Fibre Channel ports 116-118) a Fibre Channel identifier (FCID) and/or the like. Additionally, the Fibre Channel switch 130 can send the gateway device 110 a logical identifier (e.g., a logical World Wide Name (WWN)) of the Fibre Channel F port 132-134 to which the initialization signal was sent. This logical identifier can be associated with a Fibre Channel port 116-118 of the gateway device 110.

Additionally, the Fibre Channel switch 130 can receive initialization requests and/or fabric discovery (FDISC) signals for each Virtual Fibre Channel N port 153-155, 163-165, 173-175. Based on the FDISC signals, the Fibre Channel switch 130 can provide each Virtual Fibre Channel N port 153-155, 163-165, 173-175 with a Fiber Channel ID (FCID). Additionally, the Fibre Channel switch 130 can send the gateway device 110 a logical identifier (e.g., a logical WWN) of the Fibre Channel F port 132-134 to which the initialization requests and/or FDISC signals were sent. For example, if the gateway device 110 sends an initialization request to the Fibre Channel F port 132 for the Virtual Fibre Channel N port 153, the Fibre Channel switch 130 can send a logical identifier of the Fibre Channel F port 132 to the gateway device 110. The gateway device 110 can then send the logical identifier of the Fibre Channel F port 132 to the peripheral processing device 122 such that the peripheral processing device 122 can use the logical identifier of the Fibre Channel F port 132 when addressing data units such as, for example, data packets and/or data frames to be sent to the Fibre Channel switch 130. Additional details regarding the login and/or initialization signals are shown and described in U.S. patent application Ser. No. 12/976,200, filed on Dec. 22, 2010, and entitled "Apparatus and Methods to Aggregate FCOE (Fibre Channel over Ethernet) Filter Rules of a Single Interface in a Single or Few Rules on a First-Hop FCoE Networking Element," and U.S. patent application Ser. No. 12/976,222, filed on Dec. 22, 2010, and entitled "Methods and Apparatus for Providing Unique MAC Address to Individual Node For Fibre Channel Over Ethernet (FCOE) Traffic," each of which is incorporated herein by reference in its entirety.

In some instances, the Fibre Channel switch 130 can include multiple physical devices. In some instances, the Fibre Channel switch 130 can include a Fibre Channel switch fabric, such as a multi-stage Fibre Channel fabric. In such instances, the Fibre Channel switch 130 can be included in, for example, a data center, and can be define one or more logical hierarchical elements, such as virtual data center fabrics (VDCFs) and/or virtual local area networks (VLANs).

The Fibre Channel network 140 can be any combination of hardware modules and/or software modules (executing in hardware and/or stored in memory) that together comprise a Fibre Channel network. For example, although not shown in FIG. 1, the Fibre Channel network 140 can include one or more Fibre Channel-compatible servers and/or peripheral devices connected to one or more Fibre Channel switching devices including one or more host bus adapters (HBAs). In some instances, the Fibre Channel network 140 can include one or more subnetwork portions, such as one or more Fibre Channel zones and/or storage area networks (SANs). As shown in FIG. 1, the Fibre Channel network 140 can be operatively coupled to the peripheral processing devices 122-124 via the Ethernet network 120, the gateway device 110 and the Fibre Channel switch 130. In such instances, the Fibre Channel network 140 can thus exchange data with the peripheral processing devices 122-124.

In some instances, a Fibre Channel over Ethernet (FCoE) gateway (e.g., gateway device 110 of FIG. 1) supports automatic selection of Fibre Channel (FC) uplinks (e.g., Fibre Channel ports 116-118 shown in FIG. 1) connected to the FC switch (e.g., Fibre Channel switch 130 shown in FIG. 1). When a new session with an FCoE ENode (e.g., ports 152, 162, 172) is initiated (e.g., via a FLOGI), the FC interface with the smallest load is selected from the available FC uplinks. When a new FC uplink interface becomes operational, the existing load is not redistributed automatically to include the newly-available FC uplink. Sessions that are initiated after the FC uplink can select the new FC uplink.

In such an "ENode-based" load balancing approach for FCoE sessions in the load-balancer or Fibre-Channel gateway (e.g., gateway device 110) connected to interfaces (or F-ports) of a Fibre Channel switch 130, a network administrator can have the option to configure the network either via "traditional" load balancing approaches (e.g., Session-based load balancing, FLOGI-based load balancing, etc.) or via "ENode-based" load balancing. Under the "ENode-based" load balancing approach, all the sessions of an ENode (e.g., one FLOGI login and zero or more FDISC logins) will pass through the same interface (or F-port) of the Fiber Channel switch 130. Thus, one ENode's FCoE sessions are not spread across multiple interfaces (or F-ports). When a new FLOGI login request comes to the Fiber Channel switch 130 from a new ENode, an interface (or F-port) is chosen from all the available interfaces based on, for example, their current load (number of existing sessions) and capacity (bandwidth). Any subsequent FDISC requests from the same ENode, however, will take the same interface on which the FCoE session established by the FLOGI login request was placed. Hence, when the interface (or F-port) of the Fiber Channel switch 130 becomes inactive, all the sessions (FLOGIs and FDISCs) of all the ENodes on that interface become inactive. All other ENodes, whose sessions are established on other interfaces, however, remain unaffected and their sessions can continue.

Figure 2:
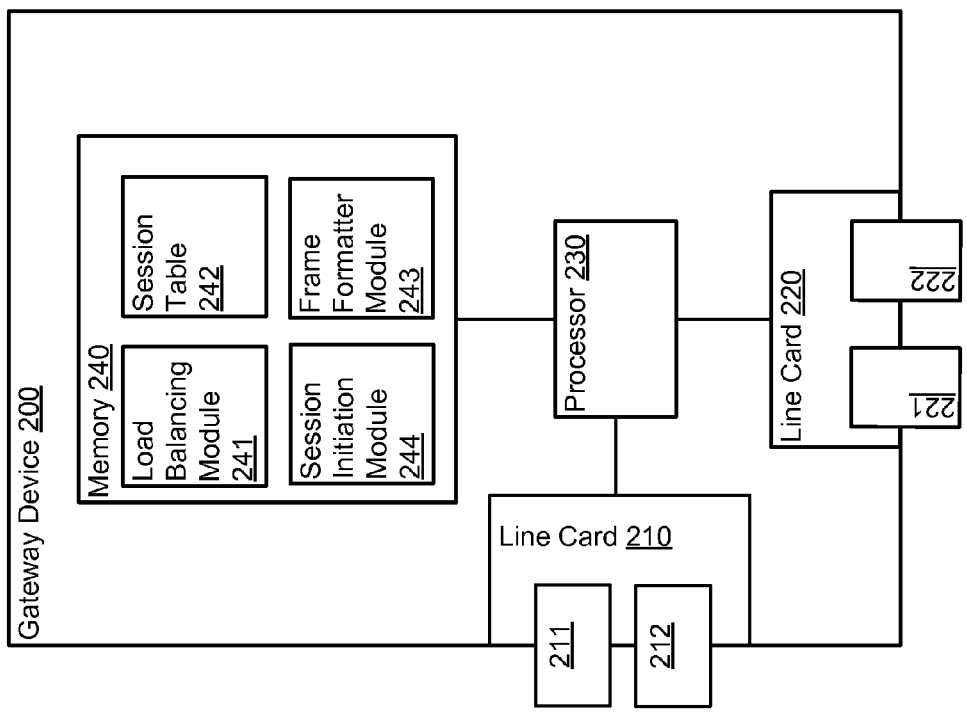
FIG. 2 is a schematic illustration of a gateway device of a mixed Fibre Channel/Ethernet network portion, according to an embodiment.

FIG. 2 is a schematic illustration of a gateway device of a mixed Fibre Chanel/Ethernet network portion, according to an embodiment. More specifically, FIG. 2 is a system block diagram of a gateway device 200, similar to the gateway device 110 described in connection with FIG. 1 above. The gateway device 200 includes a processor 230, a memory 240, a line card 210 and a line card 220. The memory 240 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 240 can store instructions to cause the processor 230 to execute modules, processes and/or functions associated with the gateway device 200. The memory 240 includes a load balancing module 241, a session table 242, a frame formatter module 243 and a session initiation module 244.

The line card 210 includes the physical ports 211 and 212, and the line card 220 includes the physical ports 221 and 222. The processor 230 can be, for example, a general purpose processor, a Field Programmable Gate Array (FPGA), an Application Specific Integrated Circuit (ASIC), a Digital Signal Processor (DSP), and/or the like. The processor 230 can be configured to run and/or execute application processes and/or other modules, instructions, processes and/or functions associated with the gateway device 200. The processor 230 is operatively coupled to the memory 240, the line card 210 and the line card 220. In some instances, the line cards 210 and/or 220 can include one or more processors and/or memories (not shown in FIG. 2). The gateway device 200 is configured to receive a Fibre Channel over Ethernet (FCoE) data unit from a Virtual Fibre Channel N port (e.g., Virtual Fibre Channel N ports 153-155, 163-165, 173-175 in FIG. 1). The gateway device 200 is configured to reformat the FCoE data unit into a Fibre Channel (FC) data unit, and to send the FC data unit to the Fibre Channel switch via a link based on the communication session of the Virtual Fibre Channel N port being associated with the link.

Similar to the Ethernet ports 112-114 of the gateway device 110 (shown in FIG. 1), the Physical Ports 211-212 and 221-222 can be configured to communicate with Ethernet devices and/or Fibre Channel peripheral processing devices via an Ethernet network. Additionally or alternatively, similar to the Fibre Channel ports 116-118 (shown in FIG. 1), the physical ports 211-212 and 221-222 can be configured to communicate with Fibre Channel devices, such as Fibre Channel switches. For example, the physical ports 211-212 and 221-222 can implement a physical layer using twisted-pair electrical signaling via electrical cables or fiber-optic signaling via fiber-optic cables. In some instances, some of the physical ports 211-212 and 221-222 can implement one physical layer such as twisted-pair electrical signaling, and others of the physical ports 211-212 and 221-222 can implement a different physical layer, such as fiber-optic signaling. Furthermore, the physical ports 211-212 and 221-222 can be configured to allow the gateway device 200 to communicate with peripheral processing devices and/or switching devices via a common protocol such as Ethernet, Fibre Channel and/or FCoE. In some configurations, some of the physical ports 211-212 and 221-222 can implement one protocol such as Ethernet/FCoE and in other configurations, the physical ports 211-212 and 221-222 can implement a different protocol such as Fibre Channel. Thus, the gateway device 200 can be in communication with multiple peripheral processing and/or switching devices using homogeneous or heterogeneous physical layers and/or protocols via the physical ports 211-212 and 221-222.

The gateway device 200 can be operatively coupled to a switch (e.g., a Fibre Channel switch) via a set of links. The gateway device 200 can operatively couple a network node (e.g., an FCoE ENode) during a communication session with the switch. The gateway device 200 can store an association between the communication session of the network node and a link from the set of multiple links such that data sent via the communication session of the network node is sent via the link. The gateway device 200 can receive from a virtual port (e.g., a Virtual Fibre Channel N ports) associated with the network node a login request (e.g., an FDISC request). The gateway device 200 can send, based on the login request from the virtual port, a login request to the switch to initiate a communication session between the virtual port and the switch. The gateway device 200 can also associate the communication session of the virtual port with the link from the set of links based on the communication session of the network node being associated with the link. The gateway device 200 can associate the communication session of the network node with the link based on at least one of a bandwidth of each link from the set of links or a number of sessions associated with each link from the set of links. The session between the network node and the switch with the selected link is based on the selected link having a greater amount of available bandwidth than each remaining link from the set of links and the selected link being associated with a number of sessions less than a number of sessions associated with each remaining link from the set of links.

In some instances, the gateway device 200 can be configured to prepare a data unit such as, for example, a data frame and/or a data packet (e.g., an Ethernet or FCoE frame and/or packet) for transmission to a peripheral processing device (e.g., one of the peripheral processing devices 122-124) or a Fibre Channel device (e.g., the Fibre Channel switch 130). For example, the frame formatter module 243 can be configured to forward, classify, and/or modify the frame encapsulation (e.g., modify, add and/or remove a header portion, footer portion and/or any other identifier included within the data frame) of a data frame prior to sending the data frame to a peripheral processing device or a Fibre Channel device. Additionally, the frame formatter module 243 can be configured to partition and/or divide the data frame into data cells (e.g., having fixed length payloads) prior to sending the data cells to the switch fabric. Further discussions about the frame formatter module 243 are included below. Additional details related to frame and/or packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

In some instances, the gateway device 200 can include a control plane module and/or portion (not shown in FIG. 2). In such instances, the control plane module and/or portion can store and/or maintain state associated with the Physical Ports 211-212 and 221-222. For example, the control plane module and/or portion can maintain a database storing an association between the physical ports 211-212 and 221-222 and their associated virtual ports at the gateway device 200. Additionally, in some instances, and as described in further detail herein, the control plane module and/or portion can send control signals to and/or receive control signals from a control plane module and/or portion of a Fibre Channel switch (e.g., Fibre Channel switch 300, described in further detail herein).

The gateway device 200 includes a load balancing module 241. The load balancing module 241 can be implemented in a gateway device 200 that is operatively coupled to a Fibre Channel switch via a set of links. The load balancing module 241 can associate a communication session between a network node and the switch (e.g., Fibre Channel switch 130 in FIG. 1) with a link from the set of links such that data units of the communication session between the network node and the switch are sent between the gateway device 200 and the switch via the link.

Additionally, the load balancing module 241 can also be configured to receive an indication of the communication session between the virtual port and the switch. The load balancing module 241 can associate the communication session between the virtual port and the switch with the link from the set of links based on the communication session between the network node and the switch being associated with the link. The gateway device 200 can also include a session initiation module 244 that is operatively coupled to the load balancing module 241. The session initiation module 244 is configured to receive, from a virtual port associated with the network node, a request to login to the switch (e.g., Fibre Channel switch 130 in FIG. 1). The session initiation module 244 is configured to send, based on the request, a login signal to the switch such that the switch initiates a communication session between the virtual port and the switch.

The gateway device 200 includes a frame formatter module 243. The frame formatter module 243 can be any hardware-based module and/or software-based module (executing in hardware and/or stored in memory) that is configured to (1) encapsulate received Fibre Channel frames within FCoE frames for transmission via the Ethernet network and/or (2) extract Fibre Channel frames from received FCoE frames for transmission to the Fibre Channel switch (e.g., Fibre Channel switch 130 in FIG. 1). The frame formatter module 243 can be configured to encapsulate Fibre Channel frames received from a virtual Fibre Channel N port within FCoE frames for transmission via an Ethernet network (e.g., Ethernet network 120 in FIG. 1). In such instances, the frame formatter module 243 can be further configured to decapsulate and/or extract Fibre Channel frames from within FCoE frames received via the Ethernet network.

The gateway device 200 also includes a session table 242. The session table 242 can be any hardware-based module and/or software-based module (executing in hardware and/or stored in memory) that can store information on communication sessions between a network node and a switch (e.g., Fibre Channel switch 130 in FIG. 1). The session table 242 can contain entries pertaining to communication sessions such as, for example, the ENode number involved in the session, a session number, a link number, the virtual port number involved in the session, the Ethernet port number involved in the session, the Fibre Channel port (F-port) number involved in the session, and/or the like. The session table 242 and organization of data (or information) in the session table will be discussed in greater detail in connection with FIG. 4.

In some instances, the gateway device 200 can be configured to define one or more filters, switching policies and/or rules that dictate how and to where data frames and/or packets are transmitted by the gateway device 200. For example, the gateway device 200 can also include a filter module (not shown in FIG. 2) stored in the memory 240 that can be configured to define a filter stipulating that data frames received from a particular logical and/or physical address should in turn be sent to a device or module having a specified logical and/or physical address. Alternatively, such a filter module can define a filter stipulating that data frames of a particular type (such as FCoE, Ethernet, or Fibre Channel) and/or having a particular priority indicator should be sent via one of a specified set of ports (such as one of the Fibre Channel ports 116-118 shown in FIG. 1). In some instances, the gateway device 200 can be configured to route data frames and/or packets according to one or more filters.

Figure 3:
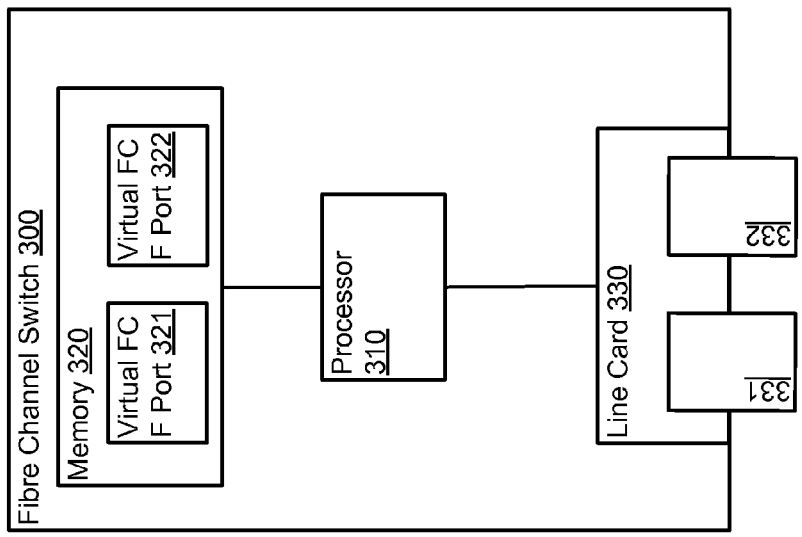
FIG. 3 is a schematic illustration of a Fibre Channel switch, according to an embodiment.

FIG. 3 is a schematic illustration of a Fibre Channel switch, according to an embodiment. More specifically, FIG. 3 is a system block diagram of a Fibre Channel switch 300 substantially similar to the Fibre Channel switch 130 described in connection with FIG. 1 above. The Fibre Channel switch 300 includes a Processor 310, a memory 320, and a line card 330. The line card 330 includes Fibre Channel ports 331 and 332. The memory 320 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 320 can store instructions to cause the processor 310 to execute modules, processes and/or functions associated with the Fibre Channel switch 300. The Memory 320 includes Virtual Fibre Channel F port 321 and Virtual Fibre Channel F port 322.

The processor 310 can be, for example, a general purpose processor, a Field Programmable Gate Array (FPGA), an Application Specific Integrated Circuit (ASIC), a Digital Signal Processor (DSP), and/or the like. The processor 310 can be configured to run and/or execute application processes and/or other modules, instructions, processes and/or functions associated with the Fibre Channel switch 300. The processor 310 is operatively coupled to the memory 320 and the line card 330. The Fibre Channel switch 300 can communicate with other Fibre Channel devices, such as an FCoE gateway (similar to the gateway device 110 shown in FIG. 1), via the Fibre Channel ports 331 and 332 in the line card 330.

In some instances, the Fibre Channel switch 300 can perform typical network switching functions on Fibre Channel frames. The Fibre Channel switch 300 can, for example, receive a Fibre Channel frame from a gateway device and route that Fibre Channel frame to an appropriate next-hop device within a Fibre Channel network to which the Fibre Channel switch 300 is operatively coupled. In some instances, the Fibre Channel switch 300 can communicate with one or more peripheral processing devices (e.g., one of the peripheral processing devices 122-124 in FIG. 1) via the Virtual Fibre Channel F port 321 and/or the Virtual Fibre Channel F port 322. For example, the Fibre Channel switch 300 can send a Fibre Channel frame from the Virtual Fibre Channel F port 321 for ultimate transmission to a virtual Fibre Channel N port instantiated at a peripheral processing device (e.g., the Virtual Fibre Channel N port 173 instantiated at the peripheral processing device 124 in FIG. 1).

In some instances, the Fibre Channel switch 300 can be configured to perform Fibre Channel login and/or initialization procedures. In some instances, the Fibre Channel switch 300 can receive a FLOGI and/or an FDISC signal from a Fibre Channel port and/or device (e.g., a virtual Fibre Channel N port, a physical Fibre Channel port, a peripheral processing device, etc.). In response to receiving the FLOGI and/or FDISC signal, the Fibre Channel switch 300 can provide the Fibre Channel port and/or device with a logical and/or physical identifier (e.g., an FCID, a logical WWN associated with the virtual Fibre Channel port 321-322 on which the login was performed, etc.).

In some instances, the Fibre Channel switch 300 includes a control plane module and/or portion (not shown in FIG. 3). In such instances, the control plane module and/or portion can store and/or maintain state information associated with the Fibre Channel ports 331 and 332. For example, the control plane module and/or portion can maintain a database storing an association between the Fibre Channel ports 331 and 332 and their associated Virtual Fibre Channel F ports 321, 322 at the Fibre Channel switch 300. Additionally, in some instances, and as described in further detail herein, the control plane module and/or portion can send control signals to and/or receive control signals from a control plane module and/or portion of a gateway device (e.g., gateway device 200, shown and described with respect to FIG. 2).

FIG. 4 is an example of data organized in a session table of a gateway device, according to an embodiment. The session table 400 can be any hardware-based module and/or software-based module (executing in hardware and/or stored in memory) that can store information on communication sessions between a network node and a switch. Data such as ENode number, VN Port number for all the VN Ports associated with an ENode, session number, link number, Ethernet port number and Fiber Channel port number for each communication session can be stored in the session table 400. Note the entries of table 400 in FIG. 4 are related to the port and node numbers as defined in FIG. 1. The information contained in the a session table 400 can be, for example, updated in real time (or substantially in real time given latency and processing speeds) as new communication sessions are introduced and other communication sessions are terminated. The information contained in the session table 400 can be used by the load balancing module (e.g., load balancing module 241 in FIG. 2) and the session initiation module (e.g., session initiation module 244 in FIG. 2) to establish and maintain communication sessions between a network node and a switch.

FIG. 5 is a flowchart illustrating a method for associating a communication session between a network node and a switch and associating a communication session between a virtual port and a switch, according to an embodiment. The method 500 includes receiving from, for example, a network node a first login request at a gateway device connecting the network node with a switch, at 502. As described above, the gateway device is operatively coupled to the switch via a set of links. As described above, the network node can be, for example, a Fibre Channel over Ethernet (FCoE) node (ENode) and the first login request can be a Fibre Channel over Ethernet (FCoE) fabric login (FLOGI) request. Additionally, as described above, the switch can be a Fibre Channel (FC) switch.

At 504, a communication session is associated between the network node and the switch by, for example, the gateway device with a link from the set of links connecting the gateway device to the switch. As described above, the gateway device can associate the communication session of the network node with the link based on, for example, at least one of a bandwidth of each link from the set of links or a number of sessions associated with each link from the set of links. Hence, the gateway device can associate the communication session between the network node and the switch with the link based on, for example, the link having a greater amount of available bandwidth than each remaining link from the set of links. The gateway device can also associate the communication session between the network node and the switch with the link based on, for example, the link having a number of sessions less than a number of sessions associated with each remaining link from the set of links. Additionally, the gateway device can send the login request to the switch via the link based on the communication session of the network node being associated with the link.

At 506, a second login request is received at, for example, the gateway device from a virtual port associated with the network node. As described above, the virtual port can be an FCoE virtual N_Port (VN_Port) and the second login request from the virtual port can be a Fibre Channel over Ethernet (FCoE) fabric discovery (FDISC) request. At 508, a third login request is defined at, for example, the gateway device that is based on the second login request. As described above, the gateway device can reformat the FCoE FDISC data unit (i.e., the second login request) into a Fibre Channel (FC) data unit (i.e., the third login request).

At 510, the third login request is sent by, for example, the gateway device to the switch to initiate a communication session between the virtual port and the switch. As described above, the gateway device can send the FC data unit (i.e., third login request) to the switch via the link based on the communication session of the virtual port and the corresponding network node being associated with the link. At 512, a communication session is associated between the virtual port and the switch with a link from the set of links by, for example, the gateway device based on the communication session between the network node and the switch being associated with the link.

The FCoE Enode-based load-balancing technique as described in FIGS. 1-5 gives a range of choices to a network administrator to configure a network. The FCoE Enode-based load-balancing technique groups all sessions from one ENode to the same interface or F-port of the Fibre Channel switch. The effect on all the ENodes of a single interface or port becoming deactivated is minimized by not spreading all the FCoE sessions across all the interfaces. The FCoE Enode-based load-balancing technique also takes advantage of the current load on an interface when a new login request (FLOGI) is received and can thus enhance bandwidth utilization and fairness in situations where ENodes with a large number of logins and ENodes with a low number of logins are present. Hence, the FCoE Enode-based load-balancing technique can also enhance bandwidth utilization when an interface becomes disabled and/or becomes enabled.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
a gateway device configured to be operatively coupled to a switch via a plurality of links, the gateway device configured to operatively couple a network node during a communication session of the network node with the switch, the gateway device storing an association between the communication session of the network node and a link from the plurality of links such that data sent via the communication session of the network node is sent via the link,
the gateway device configured to receive, from a virtual port associated with the network node, a login request, the gateway device configured to send, based on the login request from the virtual port, a login request to the switch to initiate a communication session of the virtual port between the virtual port and the switch, the gateway device configured to associate the communication session of the virtual port with the link from the plurality of links based on the communication session of the network node being associated with the link such that data sent via the communication session of the virtual port is sent via the link and such that load through the network node is balanced.

2. The apparatus of claim 1, wherein the network node is a Fibre Channel over Ethernet (FCoE) node (ENode), the virtual port is an FCoE virtual N_Port (VN_Port).

3. The apparatus of claim 1, wherein the switch is a Fibre Channel (FC) switch.

4. The apparatus of claim 1, wherein the login request from the virtual port is a Fibre Channel over Ethernet (FCoE) fabric discovery (FDISC) request.

5. The apparatus of claim 1, wherein the communication session of the network node between the network node and the switch is initiated with a Fibre Channel over Ethernet (FCoE) fabric login (FLOGI) request.

6. The apparatus of claim 1, wherein the gateway device is configured to receive a Fibre Channel over Ethernet (FCoE) data unit from the virtual port, the gateway device configured to reformat the FCoE data unit into a Fibre Channel (FC) data unit, the gateway device configured to send the FC data unit to the switch via the link based on the communication session of the virtual port being associated with the link.

7. The apparatus of claim 1, wherein the gateway device is configured to associate the communication session of the network node with the link based on at least one of a bandwidth of each link from the plurality of links or a number of sessions associated with each link from the plurality of links.

8. The apparatus of claim 1, wherein the gateway device is configured to send the login request to the switch via the link based on the communication session of the network node being associated with the link.

9. A non-transitory processor-readable medium storing code representing instructions to be executed by a processor, the code comprising code to cause the processor to:
receive, from a network node and at a gateway device connecting the network node with a switch, a first login request, the gateway device being operatively coupled to the switch via a plurality of links;
associate a session between the network node and the switch with a link from the plurality of links based on the first login request;
receive, from a virtual port associated with the network node and at the gateway device, a second login request;
define a third login request based on the second login request;
send the third login request to the switch to initiate a session between the virtual port and the switch; and
associate the session between the virtual port and the switch with the link from the plurality of links based on the session between the network node and the switch being associated with the link such that data sent via the communication session of the virtual port is sent via the link and such that load through the network node is balanced.

10. The non-transitory processor-readable medium of claim 9, wherein the code to cause the processor to associate the session between the network node and the switch with the link includes code to cause the processor to associate the session between the network node and the switch with the link based on the link having a greater amount of available bandwidth than each remaining link from the plurality of links.

11. The non-transitory processor-readable medium of claim 9, wherein the code to cause the processor to associate the session between the network node and the switch with the link includes code to cause the processor to associate the session between the network node and the switch with the link based on the link being associated with a number of sessions less than a number of sessions associated with each remaining link from the plurality of links.

12. The non-transitory processor-readable medium of claim 9, wherein the network node is a Fibre Channel over Ethernet (FCoE) node (ENode) and the virtual port is an FCoE virtual N_Port (VN_Port).

13. The non-transitory processor-readable medium of claim 9, wherein the switch is a Fibre Channel (FC) switch.

14. The non-transitory processor-readable medium of claim 9, wherein the first login request is a Fibre Channel over Ethernet (FCoE) fabric login (FLOGI) request, the third login request is an FCoE fabric discovery (FDISC) request.

15. The non-transitory processor-readable medium of claim 9, further comprising code to cause the processor to:
define a fourth login request based on the first login request; and
send the fourth login request to the switch to initiate the session between the network node and the switch.

16. The non-transitory processor-readable medium of claim 9, further comprising code to cause the processor to:
define a fourth login request based on the first login request; and
send the fourth login request to the switch to initiate the session between the network node and the switch,
the first login request is a Fibre Channel over Ethernet (FCoE) fabric login (FLOGI) request, the second login request is an FCoE fabric discovery (FDISC) request.

17. An apparatus, comprising:
a load balancing circuitry configured to be implemented in a gateway device operatively coupled to a switch via a plurality of links, the load balancing circuitry configured to associate a communication session between a network node and the switch with a link from the plurality of links such that data units of the communication session between the network node and the switch are sent between the gateway device and the switch via the link; and
a session initiation circuitry configured to be implemented in the gateway device and operatively coupled to the load balancing circuitry, the session initiation circuitry configured to receive, from a virtual port associated with the network node, a request to login to the switch, the session initiation circuitry configured to send, based on the request, a login signal to the switch such that the switch initiates a communication session between the virtual port and the switch,
the load balancing circuitry configured to receive an indication of the communication session between the virtual port and the switch, the load balancing circuitry configured to associate the communication session between the virtual port and the switch with the link from the plurality of links based on the communication session between the network node and the switch being associated with the link such that data units sent via the communication session of the virtual port are sent via the link and such that load through the network node is balanced.

18. The apparatus of claim 17, wherein the session initiation circuitry is configured to send the login signal to the switch via the link based on the communication session between the network node and the switch being associated with the link.

19. The apparatus of claim 17, wherein the network node is a Fibre Channel over Ethernet (FCoE) node (ENode), the virtual port is an FCoE virtual N_Port (VN_Port).

20. The apparatus of claim 17, wherein the switch is a Fibre Channel (FC) switch.

21. The apparatus of claim 17, wherein the request from the virtual port is a Fibre Channel over Ethernet (FCoE) fabric discovery (FDISC) request.

* * * * *